J. W. HAMMETT.
WATER PURIFICATION.
APPLICATION FILED MAY 20, 1913.
1,077,065.
Patented Oct. 28, 1913.
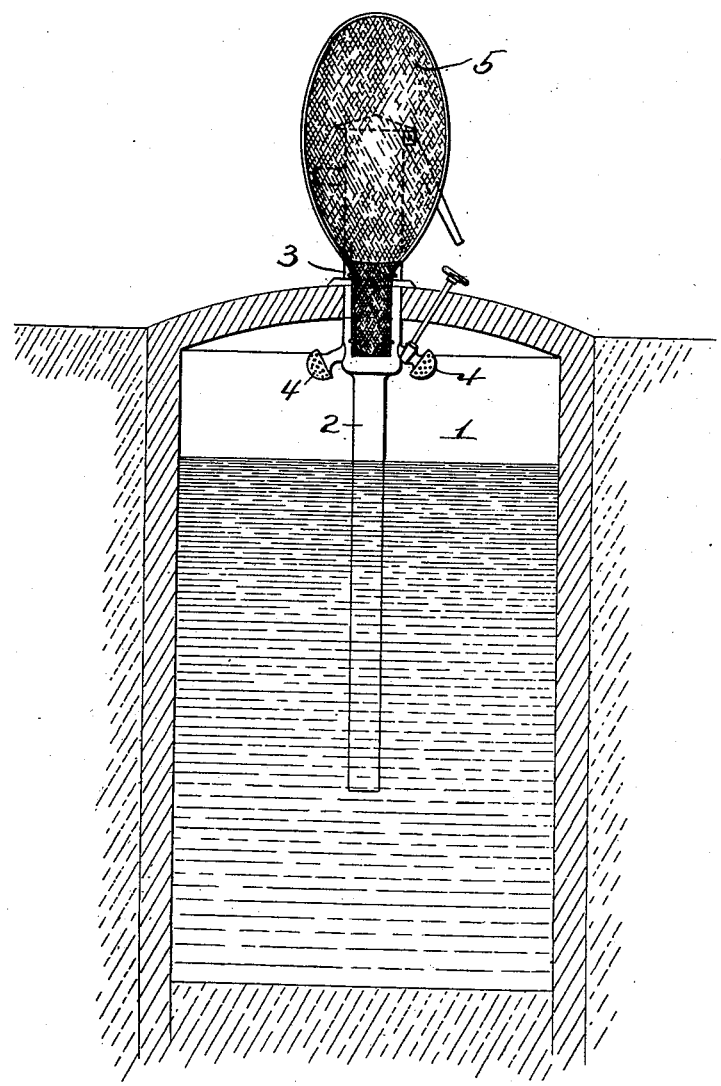

UNITED STATES PATENT OFFICE.

JAMES W. HAMMETT, OF SALAMA, WEST VIRGINIA.

WATER PURIFICATION.

1,077,065. Specification of Letters Patent. Patented Oct. 28, 1913.

Application filed May 20, 1913. Serial No. 768,839.

*To all whom it may concern:*

Be it known that I, JAMES W. HAMMETT, of Salama, in the county of Pleasants and State of West Virginia, have invented certain new and useful Improvements in Water Purification; and I do hereby declare the following to be a full, clear, and exact description of the invention, such as will enable others skilled in the art to which it appertains to make and use the same.

This invention relates to improvements in the purification of water and more particularly to means for effecting purification of water in cisterns or wells,—the object of the invention being to provide simple and efficient means, coöperable with a well or cistern and a pump, which will operate to cause the water to be purified when the pump is operated.

With this object in view, the invention consists in certain novel features of construction and combinations of parts as hereinafter set forth and pointed out in the claims.

The accompanying drawing is a view showing an embodiment of my invention.

1 represents a well or cistern and 2 a pump tube depending into the well or cistern and provided at its upper end with a pump barrel 3 and suitable operating means. The barrel 3 forms a chamber into which the water is drawn from the well or cistern and the lower end of said barrel may be disposed a few feet above the water line in the well.

A perforated nozzle or sprinkler 4 is secured to the lower portion of the barrel 3 so as to communicate with the chamber therein, and this sprinkler is so disposed that it will operate to sprinkle a portion of the water raised by the pump, back into the well. The water thus sprinkled will descend through air contained in the well and fall in drops upon the surface of the water,—such action of the water freeing certain of the impurities therefrom, which impurities will become precipitated and thus collect in the bottom of the well. Such precipitation of impurities will be facilitated by providing a suitable clay mixture in the water in the well, said clay mixture having a natural tendency to descend and carry the impurities separated by the sprinkling.

The purification of the water by the sprinkling thereof will be facilitated by the presence in the well, of an adequate amount of fresh air, and to accomplish this, I provide an air feeding device 5, resembling a miner's sail, which will operate to direct a current of fresh air into the well, said device 5 consisting of a frame supporting a sheet of canvas or similar material which is shaped at the lower end into tubular form to direct the air from the canvas sheet down into the well.

If the water in the well is very foul, it may be desirable to provide two or more nozzles 4 having sufficient aggregate capacity to sprinkle all the water raised by the pump, back into the well. When the pump shall have been operated a sufficient length of time to effect a clarifying of the water, the extra nozzle or nozzles may be cut-off or removed and the hole or holes in the pump barrel, plugged up.

Various slight changes might be made in the details of my invention without departing from the spirit thereof or limiting its scope and hence I do not wish to restrict myself to the precise details herein set forth.

Having fully described my invention what I claim as new and desire to secure by Letters-Patent, is:—

1. The combination with a well and a pump, of a spray nozzle secured to and communicating with the barrel of the pump and disposed to discharge water raised by the pump and sprinkle the same in the form of drops upon the surface of the water in the well.

2. The combination with a well and a pump to raise water in the well, of means for directing air into the well, and a spray nozzle communicating with the barrel of the pump and disposed to discharge water raised by the pump and sprinkle it in drops upon the surface of the water in the well.

In testimony whereof, I have signed this specification in the presence of two subscribing witnesses.

JAMES W. HAMMETT.

Witnesses:
R. L. GRIFFIN,
C. E. CANTNER.

Copies of this patent may be obtained for five cents each, by addressing the "Commissioner of Patents, Washington, D. C."